US012005455B2

(12) United States Patent
Gehrig

(10) Patent No.: US 12,005,455 B2
(45) Date of Patent: Jun. 11, 2024

(54) TEMPERATURE-REGULATING DEVICE FOR LABORATORY VESSELS

(71) Applicant: BRAND GMBH & CO KG, Wertheim (DE)

(72) Inventor: Steffen Gehrig, Walldürn (DE)

(73) Assignee: BRAND GMBH + CO KG, Wertheim (DE)

( * ) Notice: Subject to any disclaimer, the term of this patent is extended or adjusted under 35 U.S.C. 154(b) by 759 days.

(21) Appl. No.: 17/259,995

(22) PCT Filed: Jul. 16, 2019

(86) PCT No.: PCT/EP2019/069105

§ 371 (c)(1),
(2) Date: Jul. 6, 2021

(87) PCT Pub. No.: WO2020/016219

PCT Pub. Date: Jan. 23, 2020

(65) Prior Publication Data

US 2022/0212195 A1 Jul. 7, 2022

(30) Foreign Application Priority Data

Jul. 16, 2018 (DE) ..................... 10 2018 005 582.6
Oct. 16, 2018 (DE) ..................... 10 2018 008 152.5

(51) Int. Cl.
*B01L 7/00* (2006.01)
*B01L 9/06* (2006.01)

(52) U.S. Cl.
CPC .................. *B01L 7/00* (2013.01); *B01L 9/06* (2013.01); *B01L 2300/123* (2013.01); *B01L 2300/1855* (2013.01)

(58) Field of Classification Search
CPC ...... B01L 7/02; B01L 7/52; B01L 9/06; B01L 2300/1855; A61J 1/165
See application file for complete search history.

(56) References Cited

U.S. PATENT DOCUMENTS 3,443,396 A 5/1969 Ziolowski et al.
3,802,220 A * 4/1974 Pompo ...................... F25D 3/00 62/457.2

(Continued)

*Primary Examiner* — Nelson J Nieves

(74) *Attorney, Agent, or Firm* — Calderon Safran & Wright, PC; David S. Safran

(57) ABSTRACT

A temperature-control device for receiving of laboratory vessels has a hollow housing with a temperature-control medium. The temperature-control device is thermally conditioned before use, and during use, the conditioned thermal energy is, in a finite time period, either absorbed from the laboratory vessels or transferred to same. The lower part of the housing has a base and the upper part of the housing has, opposite to said base, a receiving region which, in an upward direction, delimits the hollow internal region of the housing. In the receiving region, depressions directed inward serve as receivers for the laboratory vessels to be temperature-controlled. The hollow housing has an air space separated from the internal region. In the internal region, the temperature-control medium flows at least partially around and/or through a horizontally extending absorber element, and said absorber element is connected to the receiving region in thermally conductive manner.

11 Claims, 3 Drawing Sheets

(56) References Cited

U.S. PATENT DOCUMENTS 3,940,249 A 2/1976 McClurg
4,322,954 A 4/1982 Sheehan et al.
4,474,033 A * 10/1984 Baker ........................ F25D 3/08 62/457.2
4,948,564 A * 8/1990 Root .......................... B01L 9/06 422/534
4,950,608 A * 8/1990 Kishimoto ......... G05D 23/1919 219/439
5,058,397 A * 10/1991 MacDonald .............. F25D 3/08 62/457.2
5,181,394 A * 1/1993 Schea, III ................. F25D 3/08 D24/227
5,863,507 A * 1/1999 James ........................ B01L 7/00 422/562
5,934,099 A 8/1999 Cook et al.
6,044,650 A * 4/2000 Cook ......................... F25D 3/08 62/130
6,361,746 B1 3/2002 Wlodarski
6,616,897 B1 * 9/2003 Lurz .......................... B01L 7/02 422/565
7,727,479 B2 * 6/2010 Heimberg ................. B01L 7/52 422/417
9,149,809 B2 * 10/2015 Guo .......................... B01L 7/52
9,297,499 B2 * 3/2016 Jimenez-Rios ........... F25D 3/10
2008/0280784 A1 * 11/2008 Guiles ................. B01L 3/50255 506/40
2009/0019865 A1 * 1/2009 Henderson ............... G01N 1/42 62/457.2
2010/0193524 A1 * 8/2010 Schmiedl .................. B01L 9/00 220/507
2010/0293970 A1 * 11/2010 Mooijer .................. F25D 16/00 62/62
2012/0085181 A1 4/2012 Etzold et al.
2013/0137105 A1 * 5/2013 Zhang ...................... C12Q 1/68 435/6.12
2014/0277695 A1 * 9/2014 Iqbal ......................... B01L 9/06 700/225
2017/0080430 A1 * 3/2017 Fu ............................. B03C 1/02
2017/0342360 A1 * 11/2017 Kim .......................... B01L 7/00
2018/0056297 A1 * 3/2018 Ebert ....................... H01L 23/38
2018/0119078 A1 * 5/2018 Kunitomi ............. C12Q 1/6825
2018/0178219 A1 * 6/2018 Bazin ........................ B01L 9/06
2019/0022658 A1 * 1/2019 Ninomiya ................. B01L 7/52

* cited by examiner

TEMPERATURE-REGULATING DEVICE FOR LABORATORY VESSELS

BACKGROUND OF THE INVENTION

Field of the Invention

The invention relates to a temperature-control device for receiving of laboratory vessels in order to keep the content of the laboratory vessels at a prescribed temperature over a prolonged period.

Description of the Related Art

International Patent Application Publication WO92/12071A1 and corresponding U.S. Pat. No. 5,181,394 disclose a storage and transport device for thermally sensitive products. The device described is intended to store particularly biologically active substances within a defined temperature range in a state that is cooled but not frozen. To that end, a container carrier of the device has depressions for glass ampoules with the substances that are comprised therein and are to be protected. The container carrier is produced from thermoplastic material and forms a self-contained space around the depressions and around a hollow peripheral edge region extending beyond the depressions. Within the self-contained space extending to the level of the depressions there is a temperature-control medium which has a high enthalpy of fusion and which changes its physical state. Water or gel materials can be used as temperature-control medium for this purpose. The hollow edge region serves for the expansion of the temperature-control medium as it undergoes phase change.

The above device has the disadvantage that, during the thermal conditioning of the device, the phase change of the temperature-control medium begins at the external side of the hollow space, and the greatest volume expansion occurs in the region where the phase change is most delayed. Because the hollow air-filled space encompasses only the edge region, deformation occurs in the center of the container carrier, whereupon the depressions are no longer located at identical height in relation to the base of the container carrier. The correct geometry is not regained until the opposite phase change takes place.

In the absence of permanent correct geometry, it is not possible to use the above type of container carrier in automated laboratory equipment for the handling of the substances in the glass ampoules or in other vessels. Deformation of the container carrier can also give rise to errors during the manual handling of a plurality of substances in adjacent depressions.

Another disadvantage with this type of container carrier is that the opposite phase change does not proceed in a uniform manner: it begins in the edge region of the hollow space and ends in the center of the container carrier. It is not possible to maintain a prescribed temperature over a required period in every depression. Furthermore, during the phase change the enthalpy of fusion is not utilized consistently and distributed across all the depressions.

European Patent Application Publication EP2428273A1 and corresponding U.S. Patent Application Publication 2012/0085181A1 disclose a temperature-control device for sample vessels in a non-autonomous design. This temperature-control device has two temperature zones which are insulated from one another for sectional heating and cooling of the sample vessels. The desired temperature is set by means of a heating element in the first temperature-control zone and by using through-flow of a heat-transfer medium in the second temperature-control zone. The temperature-control device therefore requires connections to electrical and thermal energy and is complex in relation to construction and to the number of functional elements.

SUMMARY OF THE INVENTION

The invention is based on the object of providing a temperature-control device which is intended for receiving of laboratory vessels of the type mentioned in the introduction and which keeps the content of the laboratory vessels at a prescribed temperature across, as far as possible, the entire receiving area for a prolonged period without introduction or withdrawal of thermal energy, and which is also functionally improved by virtue of its good thermal dimensional stability that can be produced at relatively low cost.

The object is achieved via a temperature-control device of the type and a temperature-control process for laboratory vessels as disclosed herein below.

In the invention, a temperature-control device for receiving of laboratory vessels has a hollow housing comprising an internal region and comprising a temperature-control medium. The temperature-control device is thermally conditioned before use thereof in the absence of laboratory vessels. During use thereof, in a finite time period, the temperature-control device either absorbs the conditioned thermal energy, i.e., heat, from the laboratory vessels or transfers said energy to the laboratory vessels. To this end, the lower part of the housing has a base, and its upper part, opposite to the base, has a receiving region which delimits the hollow internal region of the housing in upward direction. On the upper side of the receiving region, depressions directed inward serve as receivers for the laboratory vessels to be temperature-controlled.

It is preferable that the hollow housing has, alongside the internal region that accepts the temperature-control medium, a separate air space. In an alternative format, the internal region can have a partition that divides the internal region into compartments, in particular a first internal region and a second internal region. The ultimately decisive factor is that the structural design of the housing separates the air space from the temperature-control medium, i.e. that at least substantially no mixing of air space and temperature-control medium takes place. This can in particular be achieved via an appropriate component, for example, a partition. The invention moreover also allows a design in which the internal space of the housing comprises only the temperature-control medium and air, wherein the air present ultimately forms the air space for the purposes of the invention. In particular, here, a boundary is configured between the temperature-control medium and the air space.

Arranged in the internal region of the hollow housing is an absorber element which extends horizontally in the internal region and around which, and/or through which, the temperature-control medium flows. The absorber element is connected in thermally conductive manner to the receiving region. The laboratory vessels inserted into the depressions are thus kept at a constant temperature over a prolonged period by the temperature-control medium. The absorber element is in particular configured as plate.

For the purposes of the present invention, a material or a component is regarded as "thermally conductive" if its thermal conductivity is on average at least 5 W/(m·K).

The enthalpy of fusion of the temperature-control medium is absorbed by the absorber element and transported uniformly to the receiving region. The absorber element extending horizontally in the temperature-control medium permits full utilization of the thermal energy of the material of the temperature-control medium. During the thermal conditioning of the temperature-control device, the absorber element also accelerates transport of heat from the environment by way of the receiving region into the temperature-control medium. The conditioning time is shorter. "Horizontal" extension here is based on the orientation of the temperature-control device during use, and means that the absorber element extends at least substantially perpendicularly to the action of gravity. An arrangement also included here is an embodiment in which the absorber element is not parallel to the base.

In a preferred construction, the internal region of the housing is partitioned parallel to the base. The air space can advantageously be arranged opposite to the receiving region, while that part of the internal region that is adjacent to the receiving region accepts, or comprises, the temperature-control medium. Direct contact and heat exchange between the temperature-control medium and the absorber element and the receiving region is thus permitted.

In another preferred construction, there is a partition arranged between the internal regions of the housing. The partition seals the two internal regions from one another, and is flexible. The partition permits change of volume of the temperature-control medium in the dimensionally stable housing. The flexibility of the partition is achieved via the use of an elastic material, for example, silicone. The elasticity of the partition improves direct contact of the temperature-control medium with the absorber element and with the receiving region.

For the purposes of the invention, a material or component is "flexible" if it has sufficient elasticity to revert to its original shape after deformation by the forces acting on the material or component as a consequence of a change of volume of the temperature-control media during phase change. The spring rate of a material or component that is in particular suitable, for example, a partition, can be below 5 N/mm per $mm^2$. The area used in the calculation here is that area of the component onto which a corresponding pressure is exerted.

In one embodiment, the temperature-control device can be utilized for cooling or for maintaining a temperature above ambient temperature. To this end, the housing with the temperature-control medium is heated or cooled, while preferably the temperature-control medium changes its physical state and the energy relating to the phase change is utilized.

A low-cost method uses, as temperature-control medium, water or an aqueous solution which freezes on cooling.

In an advantageous embodiment, the temperature-control medium has a lower or higher density in solid phase than in its liquid phase. During phase, proceeding from the outside, the temperature-control medium that is still solid can float or sink in the temperature-control medium that has already to some extent resumed its liquid state. By virtue of the different densities here, the solid temperature-control medium moves forcibly toward the absorber element. The thermal energy of the receiving region, with the inserted laboratory vessels, is in particular altered via the contact of the solid temperature-control medium with the absorber element, the thermally conductive linkage of this element to the receiving region, and the transfer of heat. If the heat is transferred from the absorber element to the receiving region, the thermal energy of the receiving region is then increased and the laboratory vessels are heated. If the heat is transferred from the receiving region to the absorber element, the thermal energy of the receiving regions is then reduced, and the laboratory vessels are cooled.

The heat that transfers from or to the receiving region is uniform and sufficient. The constant temperature of the temperature-control medium during phase change can be utilized over a prolonged period, and the laboratory vessels can be kept at a certain temperature defined by the intrinsic physical nature of the temperature-control medium. During the preceding conditioning, the phase change from liquid to solid takes place simultaneously on almost the entire surface of the absorber element located in the temperature-control medium, rather than merely at individual locations in the center of receiving region.

A preferred design has the absorber element arranged with spatial separation from the receiving region. It is possible here that the absorber element is designed as a plate and that the absorber element is connected to the receiving region by means of one or more thermally conductive spacer elements. In advantageous design, the plate and spacer elements, and the receiving region, is made of a material with a thermal conductivity of at least 10 W/(m·K), i.e., 10 watts per meter-Kelvin. With this minimum value it is possible to ensure complete absorption of heat by the absorber element or the plate and control of the laboratory vessels to a uniform temperature with simultaneous heat transfer to the temperature-control medium.

In another preferred design, the receiving region of the housing is designed as separate part. This permits reduced heat transfer from the housing and, respectively, advantageously permits design of the receiving region from a material with a relatively high thermal conductivity of at least 100 W/(m·K). In this context, aluminum is a cost-efficient and dimensionally stable material that has excellent machining properties. The other parts of the hollow housing here can be made of a material with a substantially lower thermal conductivity of at most 1 W/(m·K).

Specifically, when a temperature-control medium is used whose density and/or volume can change during phase change of its physical state, the air space over the temperature-control medium serves for volume composition and restricts the increase of pressure on the housing and on the receiving region. In the temperature-control device of the invention, the absorber element, the underside of which is directed toward the base, and/or which takes the form of plate, extends into the temperature-control medium. The absorber element in the invention can be deformed flexibly or elastically in the direction of the receiving region. It is preferable that the absorber element has an area-based spring rate below 1 N/mm per $mm^2$ of area of the underside of the absorber element, or is retained in a manner that provides a spring rate below 1 N/mm per $mm^2$ of area of the underside of the absorber element.

The absorber element is designed either as a plate or, in an alternative design, as a structured, elastic molding, the plate or else the molding being preferably additionally retained in resilient manner on the receiving region by spacer elements. Both variants of a temperature-control device are not adversely affected during the phase change and also permit a volume change of the temperature-control medium in the solid state without loss of their function or deformation of the housing.

Other preferred embodiments of the temperature-control device of the invention will be apparent from the description below in conjunction with the accompanying drawings.

DETAILED DESCRIPTION OF THE INVENTION

Figure 1:
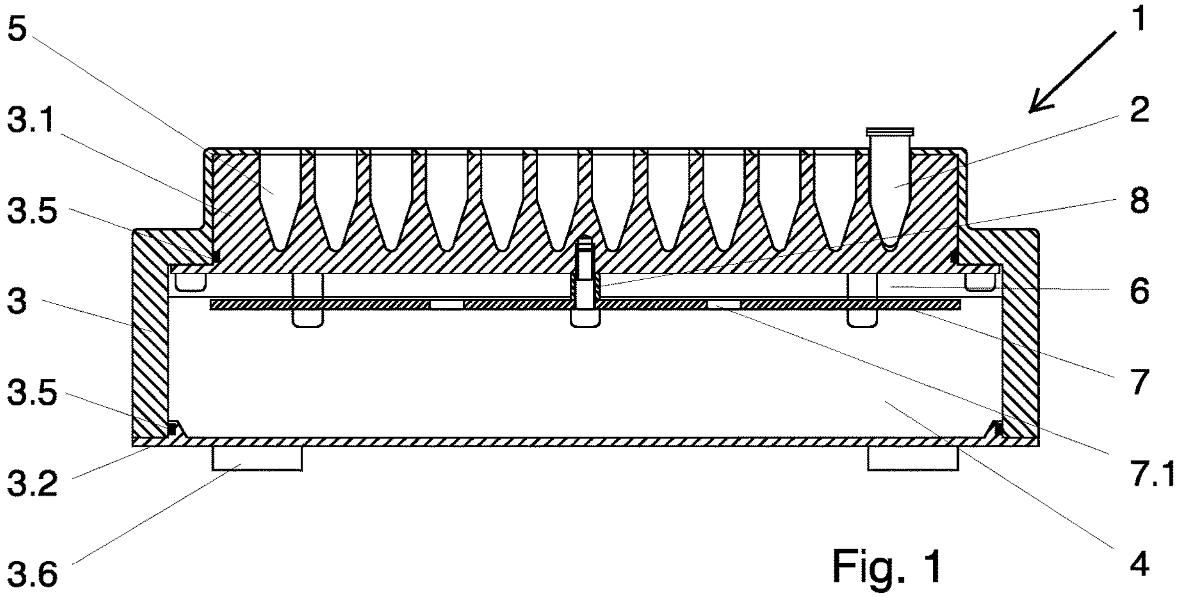
FIG. 1 shows a sectional view of a temperature-control device of the invention.

FIG. 1 shows a temperature-control device 1 of the invention for receiving of laboratory vessels 2. Before use, i.e., in the absence of the laboratory vessels 2, the temperature-control device 1 is thermally conditioned, and for this purpose its temperature is controlled in a refrigerator or heating cabinet. During use, in a finite time period, the temperature-control device 1 either absorbs the conditioned thermal energy from the laboratory vessels 2 and the environment or dissipates said energy.

Figure 2:
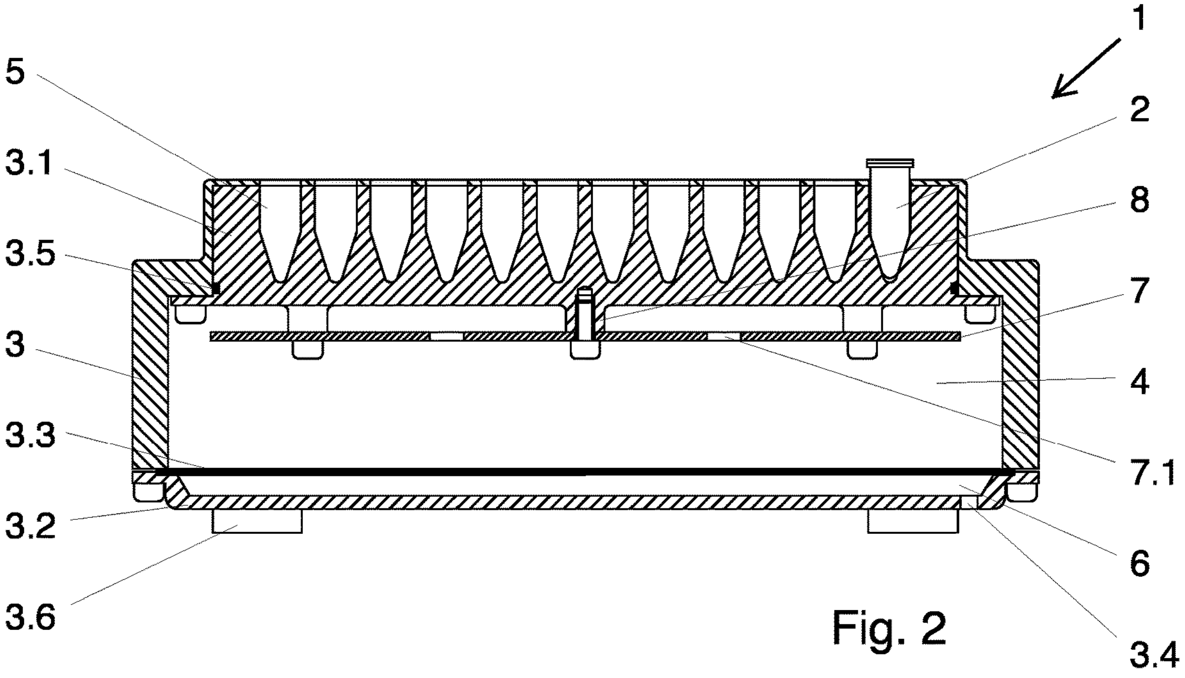
FIG. 2 shows a preferred form of design of the temperature-control device of FIG. 1.

The temperature-control device 1 shown in FIGS. 1 and 2 comprises a hollow housing 3 at least partially filled with a temperature-control medium 4 in the internal region of the housing 3. The housing 3 is used as autonomous device in the laboratory, and to this end has, in use, in its lower part or on an underside, a base 3.2, and has, in its upper part or on an upper side, opposite to the base, a receiving region 3.1 which delimits the hollow internal region of the housing 3 in an upward direction.

Configured on the receiving region 3.1 are depressions 5 which are directed from above in the direction of the base 3.2 and inward, and which serve as receivers for the laboratory vessels 2 that are to be temperature-controlled. The base 3.2 can be dimensioned in SBS (Society of Biomolecular Screening) format, and the number of depressions 5 can be arranged in the SBS standard array: 12×8, 24×16, etc.

The temperature-control device 1 can, while standing on the base 3.2 or lying on the depressions 5, in each case before use of said device with laboratory vessels 2, be thermally conditioned, i.e., heated or cooled, in order to assume a certain temperature differing from the usage environment.

FIG. 1 shows a temperature-control device 1 representing a design example. However, it is possible that, unlike in the depictions, the arrangement of the receiving region 3.1 on the housing 3 is releasable, in particular from above. The housing 3 can, as depicted, cover intervening spaces around the depressions 5. It is possible that, unlike in the depictions, this part is designed to be separate from the housing 3. It is likewise possible that, unlike in the depictions, the arrangement of the receiving region 3.1 of the housing 3 is releasable from above.

FIG. 2 shows the temperature-control device 1 of the invention with the hollow housing 3 which has an air space 6 separated from the internal region that accepts or comprises the temperature-control medium 4. The partitioning of the internal region runs at least substantially parallel to the base 3.2, on which in particular the device can rest. Unlike in the design in FIG. 1, the air space 6 is arranged opposite to the receiving region 3.1, and is a part of the internal region. The remaining part of the internal region, adjacent to the receiving region 3.1, accepts the temperature-control medium 4. Heat transfer therefore also takes place directly between temperature-control medium 4 and the receiving region 3.1.

In an advantageous design, arranged between the hollow internal regions or the base 3.2 and the housing 3 is a partition 3.3 which seals the two internal regions from one another and is flexible. The partition 3.3 can also be arranged within other parts of the housing 3. The design in FIGS. 1 and 2, in which the base 3.2 comprises one part of the hollow internal region, is an advantageous design in this respect.

In the design in FIG. 2, the base 3.2 has a hole 3.4 through which air passes into and/or out of the air space 6. Alternatively, the air space 6 is a leak-proof enclosure, and pressure change therein can be utilized to move the temperature-control medium 4 forcibly toward the receiving region 3.1.

FIG. 2 shows the temperature-control medium 4 substantially completely filling that internal region of the housing 3 that is adjacent to the receiving region 3.1; although this is desirable in practice it is however mostly not completely possible. When temperature-control medium 4 is charged to the internal region, which is then closed by the partition 3.3, there can still be air concomitantly included. The internal region is therefore filled completely with temperature-control medium 4 or filled partially with temperature-control medium 4 and with air. The closer and more direct the contact between the temperature-control medium 4 and the receiving region 3.1, the better the thermal connection achieved by same. Heat transfer can therefore be increased by reducing the separation of the temperature-control media 4 from the receiving region 3.1 and by reducing the number of intermediate elements transferring the heat. The ideal situation here is direct contact between temperature-control medium 4 and receiving region 3.1. Preference is therefore given to filling of the greatest possible part of the internal region adjacent to the receiving region 3.1 with temperature-control medium 4. The predominant part of the internal region that adjoins the receiving region 3.1 is therefore preferably filled with temperature-control medium 4. In particular, the volume of the temperature-control medium in that part of the internal region that adjoins the receiving region 3.1 is greater than the volume of the air present there.

The temperature-control device 1 in FIG. 2 has, in the hollow housing 3, an absorber element 7 which is designed as plate and which extends horizontally in the housing 3. The arrangement of the absorber element 7 here in relation to the receiving region 3.1 and housing 3 with spatial separation, and the quantity of the temperature-control medium 4, are selected in a manner such that the temperature-control medium 4 at least partially flows around the absorber element 7, i.e. that the absorber element 7 has contact with the temperature-controlled temperature-control medium 4 and/or is immersed therein.

The absorber element 7 can have one or more apertures 7.1 which permit through-flow of air bubbles and, with appropriate size of the aperture 7.1 and appropriate viscosity of the temperature-control medium 4, at least partial flow of the temperature-control medium 4 through the absorber element 7.

The absorber element 7 is connected to the receiving region 3.1 in a manner that provides good thermal conductivity for the transfer of thermal energy, and thus transfers the temperature of the temperature-control medium 4 to the laboratory vessels 2.

The temperature-control device 1 of the invention is exposed, before use thereof, to the desired temperature for a sufficient time. The housing with the temperature-control medium 4 of the temperature-control device 1 is heated or cooled, in accordance with the temperature range required by the substances in the laboratory vessels 2.

The temperature-control medium 4 used in the housing 3 changes its physical state during heating or cooling. During cooling, the temperature-control medium 4 freezes, and during heating it melts. The energy of the phase change (by way of example, in the case of water: 333.4 kJ/kg at 0° C.) is effectively utilized here.

Low-cost temperature-control medium 4 preferably used for the cooling of the laboratory vessels 2 is water, an aqueous solution, a glycol/water mixture and/or a gel material, in particular an aqueous carboxymethylcellulose gel. Alternatively, before the heating of laboratory vessels 2 or for keeping these at a temperature above ambient temperature, a mixture of cyclodextrin and 4-methylpyridine is used as temperature-control medium 4. It is also possible to use a polymer solution made of a plurality of soluble substances with different phase temperatures and with a concentration-dependent miscibility gap, for example, a phenol/water mixture.

The temperature-control device 1 in FIGS. 1 and 2 is alternatively used for the heating of laboratory vessels 2 between 30° C. and 45° C. To this end, the abovementioned mixture of cyclodextrin and 4-methylpyridine is charged to the housing 3. The temperature-control device 1 is conditioned at about 50° C. or above. The size of the absorber element 7 here in the internal region of the housing 3 is greater than in the embodiment shown in FIG. 1 or 2.

The temperature-control device 1 shown in FIGS. 1 and 2 is particularly designed for temperature-control medium 4, which has a lower density in its solid phase than in its liquid phase. When this type of temperature-control medium 4, on melting, has already to some extent resumed its liquid state, but to some extent remains in the solid state, the solid state floats and moves forcibly toward the absorber element 7.

In the design in FIG. 2, the still-solid temperature-control medium 4 also moves forcibly toward the receiving region 3.1. The contact of the solid temperature-control medium 4 with the absorber element 7 and optionally also with the receiving region 3.1 causes areal melting of the temperature-control medium 4. The absorber element 7, the temperature of which has thus been changed, conducts the heat from the receiving region 3.1 with the inserted laboratory vessels 2 to the temperature-control medium 4, and increases the thermal energy thereof, or vice versa. In particular, here, the frozen state of the temperature-control medium 4 in the volume enclosed by the housing 3 and by the receiving region 3.1 is fully utilized. The laboratory vessels 2 can be cooled or heated over a long period.

Figure 5:
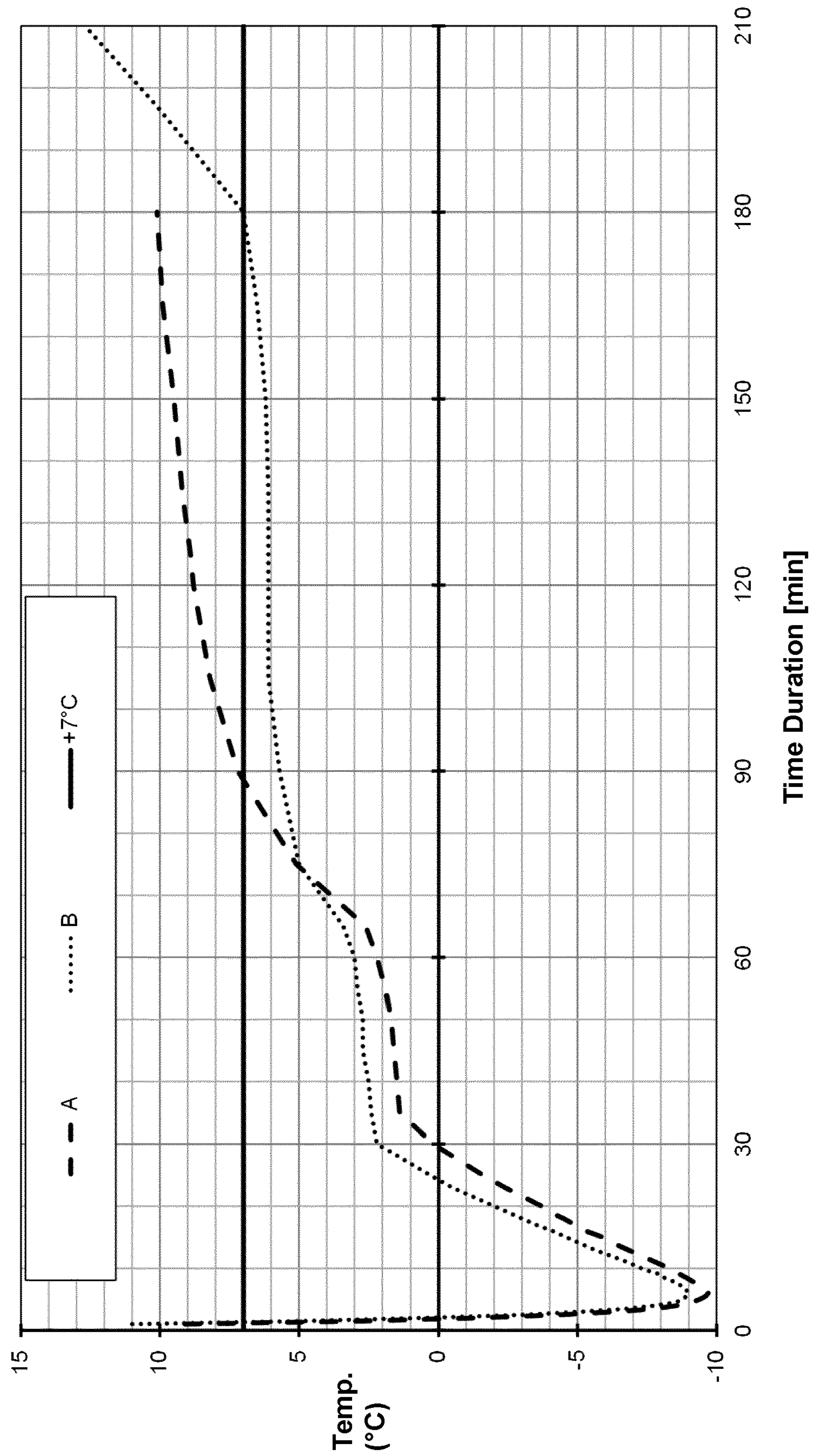
FIG. 5 shows a diagram relating to temperature profiles of the temperature-control device.

The effectiveness of the design of the invention in FIG. 1 or 2 in comparison with a design without an absorber element 7 is shown by FIG. 5, with the respective profile for a water-cooled housing 3 of both designs, measured in their respective depressions 5. The temperature profile "A" corresponds to the design without absorber element, and "B" corresponds to the design of the invention in FIG. 1 or 2. The temperature is kept below the limit of 7° C. for twice as long in the case of "B" as in "A". Other temperature-control media 4 provide a different temperature limit and temperature profile corresponding to their intrinsic physical nature.

FIG. 2 shows the temperature-control device 1 of the invention with the housing 3 which has an air space 6 separated from the internal region. The internal region is partitioned at least substantially parallel to the base 3.2.

Improvements provided by the design in FIG. 2 are not related solely to construction. Surprisingly, advantages are also seen in effectiveness and in the resultant temperature profile "B". The flexible partition 3.3 permits the spatial separation of temperature-control medium 4 and air space 6 and the compensation of changes in the volume of the temperature-control medium 4 in the direction of the air space 6 or in the opposite direction.

In the case of the particularly preferred embodiment shown in FIGS. 1 and 2, the partition 3.3 is designed from a flexible, i.e., elastic, material, for example, from silicone.

The increase in volume of the solid or frozen temperature-control medium 4 is permitted by the expansion of the pretensioned partition 3.3 into the air space 6. The solid temperature-control medium 4 here is forced toward the absorber element 7. The applied pressure increases the transfer of heat during use of the temperature-control device 1, and the temperature profile "B" is kept under the temperature limit for an even longer time. This effect lasts even longer if the partition 3.3 also has low thermal conductivity.

FIG. 2 shows an embodiment of a plate with, as absorber element 7, a plate arranged horizontally in the hollow housing 3. In this design form, the plate is secured to the receiving region 3.1 by a plurality of spacer elements 8. The spacer elements 8 here also connect the plate 7 to the receiving region 3.1 in thermally conductive manner, their number being such that the temperature of the temperature-control medium 4 is transferred to the laboratory vessels 2.

Another decisive factor in the design of the invention in FIG. 1 or 2 is the materials used. The absorber element 7, or the plate, the spacer elements 8 and/or the receiving region 3.1 consist in particular of a material with a thermal conductivity of at least 10 W/(m·K).

A preferred design has the receiving region 3.1 of the housing 3 formed as a separate part. The receiving region 3.1 is not coherently connected to the housing 3, and consists of a material with a thermal conductivity of at least 100 W/(m·K). In particular, aluminum is used as suitable material. The other parts of the hollow housing 3 can consist of plastic or can comprise a plastic, and preferably have a thermal conductivity of at most 1 W/(m·K), and thus a more thermally insulating effect.

The structure of the housing 3 here can have even more discrete elements. In FIGS. 1 and 2, the housing 3 has a separate base 3.2, which is opposite to the receiving region 3.1, and on which the device can stand. Gaskets 3.5 seal the base 3.2 and the receiving region 3.1 with respect to the housing 3. As shown in FIG. 2, there are projecting supportive feet 3.6 arranged on the base.

Figure 3:
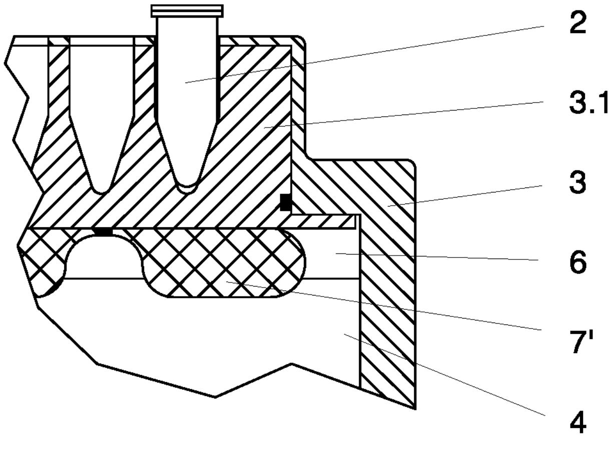
FIG. 3 shows a view of detail of an alternative preferred form of design of the temperature-control device of FIG. 1.

In another preferred design of the temperature-control device 1, the absorber element 7 with its absorber underside directed toward the base 3.2 is configured to be flexible in the direction of the receiving region 3.1. The absorber element 7 tolerates the change in volume of the temperature-control medium 4. In preferred design, the absorber element 7 is a structured elastic molding 7', as shown in FIG. 3. This areal molding 7' is preferably sufficiently impressible, with a spring rate below 1 N/mm per $mm^2$ of area of the underside of the molding 7', to prevent deformation of the housing 3.

The molding 7' shown in FIG. 3 is a layer of metal mesh or of metal foam. The molding 7' is arranged on the underside of the receiving region 3.1. This type of mesh or foam serves as absorber for the absorption and simultaneous transport of the thermal energy to the receiving region 3.1. The mesh or the foam is likewise positioned to extend through the air space 6 below the receiving region 3.1 and to be at least to some extent surrounded by, and as far as possible here completely penetrated by, the temperature-control medium 4. The structure intrinsically permits the required flexibility, and the selection of the material, and also the cross-sectional density, permit adequate conduction of heat to the receiving region 3.1. In a simplified variant, the mesh or the foam can also serve merely as flexible spacer elements 8' which relate to the plate and provide a springing effect.

In the design of a plate with spacer elements 8, the spacer elements 8 hold the plate in flexible manner, with a springing effect, in relation to the receiving region 3.1. As shown in FIG. 1, the plate is at least to some extent surrounded by temperature-control medium 4. During expansion of volume of the temperature-control medium 4 in the solid state, this moves forcibly toward the plate, and is tolerated by virtue of the flexible positioning of the plate and/or elastic change of shape thereof.

Figure 4:
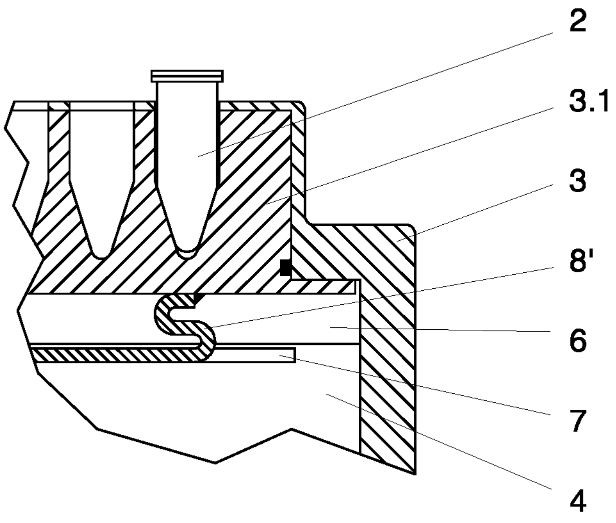
FIG. 4 shows a view of detail of an alternative preferred form of design of the temperature-control device of FIG. 1.

It is moreover preferable that connection of the absorber element 7 on the receiving region 3.1 is releasable or non-releasable. In FIG. 3, the absorber element 7 is connected at a plurality of points to the underside of the receiving region 3.1, e.g. ultrasound-welded thereto. In design in FIG. 1 or 2, the spacer elements 8 are molded onto the receiving region 3.1 and/or the plate to form a single unit, thus providing good conduction of heat. FIG. 4 shows a design form of a flexible spacer element 8'. This spacer element 8' is a part of the plate.

Incisions, not shown, provide freedom to the spacer element 8' and permit undulant bending as shown in FIG. 4. In particular, the free end of the resultant spacer element 8' is welded onto the receiving region 3.1. It is alternatively possible that screw threads are used for releasable attachment of the spacer elements 8, i.e., that they are held by a frictional/interlocking connection, or that they are permanently fixedly connected, for example, welded, soldered, bonded by adhesive or by another form of bonding, or coherently connected in another manner.

What is claimed is:

1. A temperature-control device for laboratory vessels which is configured to be thermally conditioned in the absence of laboratory vessels before use and, during use, in a finite time period, to absorb the conditioned thermal energy from the laboratory vessels and/or to transfer said thermal energy to the laboratory vessels, comprising:

a hollow housing which has an internal region at least substantially filled with a temperature-control medium, wherein the housing has a base on an underside and a receiving region situated opposite to the base on an upper side, the receiving region delimiting the internal region of the housing in an upward direction and wherein the housing has inwardly directed depressions on said upper side for receiving of laboratory vessels to be temperature-controlled, wherein the housing has an air space, wherein a horizontally extending absorber element is arranged in the internal region of the housing in a manner enabling the temperature-control medium to at least partially flow around and/or through the absorber element, and wherein the absorber element and the receiving region are connected in a thermally conductive manner, and wherein the temperature-control medium has properties that enable a change of physical state at least to some extent from a solid phase to a liquid phase during absorption of thermal energy from the laboratory vessels and/or to change its physical state from a liquid phase to a solid phase during transfer of thermal energy to the laboratory vessels, and wherein the solid phase of the temperature-control medium has a different density than the liquid phase of the temperature-control medium, so that the solid phase floats or sinks in the liquid phase of the temperature-control medium and moves forcibly toward the absorber element.

2. The temperature-control device as claimed in claim 1, wherein the internal region of the housing is partitioned at least substantially parallel to the base and/or the air space is arranged on a side of the internal region that is opposite to the receiving region, and the temperature-control medium is located in a part of the internal region that is adjacent to the receiving region.

3. The temperature-control device as claimed in claim 1, wherein the temperature-control device is configured to increase the thermal energy of the receiving region with the inserted laboratory vessels via contact of the solid phase of the temperature-control medium with the absorber element and transfer of heat from the absorber element to the receiving region for the heating of the laboratory vessels or to reduce the thermal energy of the receiving region with the inserted laboratory vessels via contact of the solid phase of the temperature-control medium with the absorber element and transfer of heat from the receiving region to the absorber element for the cooling of the laboratory vessels.

4. The temperature-control device as claimed in claim 1, wherein the absorber element is arranged spatially separated from the receiving region, wherein the absorber element comprises a plate and/or is connected to the receiving region by one or more thermally conductive spacer elements.

5. The temperature-control device as claimed in claim 1, wherein the receiving region of the housing is a separate part and is formed of a material with a thermal conductivity of at least 100 W/(m·K), and wherein other parts of the housing are formed of a material with a thermal conductivity of at most 1 W/(m·K).

6. The temperature-control device as claimed in claim 1, wherein at least at an underside of the absorber that faces toward the base, the absorber element is elastically deformable in a direction toward the receiving region and/or at least one spacer element holds the absorber element in a resilient manner on the receiving region.

7. The temperature-control device as claimed in claim 1, wherein the absorber element is a structured elastic molding, an underside of which faces toward the base, the molding being elastically deformable in a direction toward the receiving region, and wherein the underside of the absorber has a spring rate below 1 N/mm per $mm^2$ of the absorber underside.

8. The temperature-control device of claim 1, wherein the temperature-control medium is water or an aqueous solution.

9. A temperature-control process for laboratory vessels, comprising the following steps:

providing a temperature-control device with an internal region at least partially filled with a temperature-control medium and with a housing with a receiving region which upwardly delimits a hollow internal region of the housing in an upward direction, and with depressions directed inward on an upper side of the receiving region, thermal conditioning the temperature-control device before use in the absence of laboratory vessels, insertion of the laboratory vessels, absorption or transfer of conditioned thermal energy from the laboratory vessels or to the laboratory vessels in a finite time period, wherein the temperature-control medium at least partially flows around and/or through an absorber element which extends horizontally within the internal region of the housing, and which is connected to the receiving region in a thermally conductive manner, and wherein the temperature-control medium is selected in a manner such that a solid phase of the temperature-control medium has a different density than a liquid phase of the temperature-control medium, so that the solid phase floats or sinks in the liquid phase of the temperature-control medium and moves forcibly toward the absorber element due to the different densities of the phases.

10. The temperature-control process as claimed in claim 9, wherein the housing with the temperature-control medium is heated or cooled to produce a change in physical state of the temperature-control medium which is water or an aqueous solution.

11. A temperature-control device for laboratory vessels which is configured to be thermally conditioned in the absence of laboratory vessels before use and, during use, in a finite time period, to absorb the conditioned thermal energy from the laboratory vessels and/or to transfer said thermal energy to the laboratory vessels, comprising:

a hollow housing which has an internal region at least substantially filled with a temperature-control medium, wherein the housing has a base on an underside and a receiving region situated opposite to the base on an upper side, the receiving region delimiting the internal region of the housing in an upward direction and wherein the housing has inwardly directed depressions on said upper side for receiving of laboratory vessels to be temperature-controlled, wherein the housing has an air space, wherein a horizontally extending absorber element is arranged in the internal region of the housing in a manner enabling the temperature-control medium to at least partially flow around and/or through the absorber element, wherein the absorber element and the receiving region are connected in a thermally conductive manner, and wherein, at least one of:

the internal region of the housing is filled with the temperature-control medium as far as the absorber element and a remaining part of the internal region comprises the air space, or the internal region of the housing is partitioned such that the temperature-control medium is present in a first internal region and the air space is present in a second internal region, a partition sealing the first and second internal regions from one another, the partition being flexible and made of an elastic material.

* * * * *